US010069701B2

United States Patent
Elias et al.

(10) Patent No.: US 10,069,701 B2
(45) Date of Patent: Sep. 4, 2018

(54) FLEXIBLE ALLOCATION OF PACKET BUFFERS

(71) Applicant: MELLANOX TECHNOLOGIES TLV LTD., Raanana (IL)

(72) Inventors: George Elias, Tel Aviv (IL); Barak Gafni, Kfar Malal (IL); Shachar Bar Tikva, Petach Tikva (IL); Roy Kriss, Netanya (IL); Eran Rubinstein, Hod Hasharon (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 0 days.

(21) Appl. No.: 14/994,164

(22) Filed: Jan. 13, 2016

(65) Prior Publication Data

US 2017/0201469 A1 Jul. 13, 2017

(51) Int. Cl.
  *H04L 12/26* (2006.01)
  *H04L 12/937* (2013.01)
  *H04L 12/933* (2013.01)

(52) U.S. Cl.
  CPC ........ *H04L 43/0817* (2013.01); *H04L 49/108* (2013.01); *H04L 49/254* (2013.01)

(58) Field of Classification Search
  CPC ............. H04L 49/9005; H04L 43/0805; H04L 47/6295; H04L 49/3018; H04L 49/3027; H04L 49/3036; H04L 47/266; H04L 47/30; H04L 49/103; H04L 47/10; H04L 49/351; H04L 12/4645; H04L 47/2441
  USPC ........................................................ 370/417
  See application file for complete search history.

(56) References Cited

U.S. PATENT DOCUMENTS

| 6,108,713 A | 8/2000 | Sambamurthy et al. |
| 6,178,448 B1 | 1/2001 | Gray et al. |
| 6,594,263 B1 | 7/2003 | Martinsson et al. |

(Continued)

FOREIGN PATENT DOCUMENTS

| EP | 1720295 A1 | 11/2006 |
| EP | 2466476 | 6/2012 |

(Continued)

OTHER PUBLICATIONS

Hahne et al., "Dynamic Queue Length Thresholds for Multiple Loss Priorities", IEEE/ACM Transactions on Networking, vol. 10, No. 3, pp. 368-380, Jun. 2002.

(Continued)

*Primary Examiner* — Andrew W Chriss
*Assistant Examiner* — Lalita W Pace
(74) *Attorney, Agent, or Firm* — D. Kligler IP Services Ltd.

(57) ABSTRACT

Communication apparatus includes multiple ports configured to serve as ingress ports and egress ports for connection to a packet data network. A single memory array is coupled to the ports and configured to contain both a respective headroom allocation for each ingress port and a shared buffer holding data packets for transmission in multiple queues via the egress ports. Control logic is configured to adjustably allocate to each ingress port a respective volume of memory within the single memory array to serve as the respective headroom allocation, and to queue the data packets in the multiple queues in the single memory array for transmission through the egress ports.

11 Claims, 5 Drawing Sheets

(56) References Cited

U.S. PATENT DOCUMENTS

| | | | |
|---|---|---|---|
| 7,321,553 B2* | 1/2008 | Prasad | H04L 47/10 370/230 |
| 7,821,939 B2 | 10/2010 | Decusatis et al. | |
| 8,078,743 B2 | 12/2011 | Sharp et al. | |
| 8,345,548 B2 | 1/2013 | Gusat et al. | |
| 8,473,693 B1* | 6/2013 | Muppalaneni | G06F 5/065 707/781 |
| 8,576,715 B2 | 11/2013 | Bloch et al. | |
| 8,767,561 B2 | 7/2014 | Gnanasekaran et al. | |
| 8,811,183 B1 | 8/2014 | Anand et al. | |
| 8,879,396 B2 | 11/2014 | Guay et al. | |
| 8,989,017 B2 | 3/2015 | Naouri et al. | |
| 8,995,265 B2 | 3/2015 | Basso et al. | |
| 9,014,006 B2 | 4/2015 | Haramaty et al. | |
| 9,325,619 B2 | 4/2016 | Guay et al. | |
| 9,356,868 B2 | 5/2016 | Tabatabaee et al. | |
| 9,426,085 B1 | 8/2016 | Anand et al. | |
| 2002/0191559 A1 | 12/2002 | Chen et al. | |
| 2003/0108010 A1 | 6/2003 | Kim et al. | |
| 2003/0223368 A1 | 12/2003 | Allen et al. | |
| 2004/0008714 A1* | 1/2004 | Jones | H04L 47/2441 370/428 |
| 2005/0053077 A1 | 3/2005 | Blanc et al. | |
| 2005/0169172 A1 | 8/2005 | Wang et al. | |
| 2005/0216822 A1 | 9/2005 | Kyusojin et al. | |
| 2005/0226156 A1 | 10/2005 | Keating et al. | |
| 2005/0228900 A1 | 10/2005 | Stuart et al. | |
| 2006/0088036 A1 | 4/2006 | De Prezzo | |
| 2006/0092837 A1* | 5/2006 | Kwan | H04L 47/10 370/229 |
| 2006/0092845 A1* | 5/2006 | Kwan | H04L 47/50 370/235 |
| 2007/0097257 A1 | 5/2007 | El-Maleh et al. | |
| 2007/0104102 A1 | 5/2007 | Opsasnick | |
| 2007/0104211 A1* | 5/2007 | Opsasnick | H04L 45/7453 370/412 |
| 2007/0201499 A1 | 8/2007 | Kapoor et al. | |
| 2007/0291644 A1 | 12/2007 | Roberts et al. | |
| 2008/0037420 A1 | 2/2008 | Tang et al. | |
| 2008/0175146 A1 | 7/2008 | Van Leekwuck et al. | |
| 2008/0192764 A1 | 8/2008 | Arefi et al. | |
| 2009/0207848 A1* | 8/2009 | Kwan | H04L 45/00 370/397 |
| 2010/0220742 A1 | 9/2010 | Brewer et al. | |
| 2013/0014118 A1 | 1/2013 | Jones | |
| 2013/0039178 A1 | 2/2013 | Chen et al. | |
| 2013/0250757 A1 | 9/2013 | Tabatabaee et al. | |
| 2013/0250762 A1 | 9/2013 | Assarpour | |
| 2013/0275631 A1 | 10/2013 | Magro et al. | |
| 2013/0286834 A1 | 10/2013 | Lee | |
| 2013/0305250 A1 | 11/2013 | Durant | |
| 2014/0133314 A1* | 5/2014 | Matthews | H04L 43/50 370/244 |
| 2014/0269324 A1 | 9/2014 | Tietz et al. | |
| 2015/0026361 A1* | 1/2015 | Matthews | H04L 67/28 709/234 |
| 2015/0124611 A1 | 5/2015 | Attar et al. | |
| 2015/0127797 A1 | 5/2015 | Attar et al. | |
| 2015/0180782 A1 | 6/2015 | Rimmer et al. | |
| 2015/0200866 A1 | 7/2015 | Pope et al. | |
| 2015/0381505 A1 | 12/2015 | Sundararaman et al. | |
| 2016/0135076 A1 | 5/2016 | Grinshpun et al. | |
| 2017/0118108 A1 | 4/2017 | Avci et al. | |
| 2017/0142020 A1 | 5/2017 | Sundararaman et al. | |
| 2017/0180261 A1 | 6/2017 | Ma et al. | |
| 2017/0187641 A1 | 6/2017 | Lundqvist et al. | |

FOREIGN PATENT DOCUMENTS

| | | |
|---|---|---|
| WO | 2009107089 | 9/2009 |
| WO | 2013136355 A1 | 9/2013 |
| WO | 2013180691 A1 | 12/2013 |

OTHER PUBLICATIONS

Choudhury et al., "Dynamic Queue Length Thresholds for Shared-Memory Packet Switches", IEEE/ACM Transactions Networking, vol. 6, Issue 2 , pp. 130-140, Apr. 1998.

Gafni et al., U.S. Appl. No. 14/672,357, filed Mar. 30, 3015.

Ramakrishnan et al., "The Addition of Explicit Congestion Notification (ECN) to IP", Request for Comments 3168, Network Working Group, 63 pages, Sep. 2001.

IEEE Standard 802.1Q™—2005, "IEEE Standard for Local and metropolitan area networks Virtual Bridged Local Area Networks", 303 pages, May 19, 2006.

INFINIBAND TM Architecture, Specification vol. 1, Release 1.2.1, Chapter 12, pp. 651-716, Nov. 2007.

IEEE Std 802.3, Standard for Information Technology—Telecommunications and information exchange between systems—Local and metropolitan area networks—Specific requirements; Part 3: Carrier Sense Multiple Access with Collision Detection (CSMA/CD) Access Method and Physical Layer Specifications Corrigendum 1: Timing Considerations for PAUSE Operation, Annex 31B (MAC Control PAUSE operation), pp. 763-772, year 2005.

IEEE Std 802.1Qbb., IEEE Standard for Local and metropolitan area networks—"Media Access Control (MAC) Bridges and Virtual Bridged Local Area Networks—Amendment 17: Priority-based Flow Control", 40 pages, Sep. 30, 2011.

Elias et al., U.S. Appl. No. 14/718,114, filed May 21, 2015.

Gafni et al., U.S. Appl. No. 15/075,158, filed Mar. 20, 2016.

Shpiner et al., U.S. Appl. No. 14/967,403, filed Dec. 14, 2015.

CISCO Systems, Inc.,"Advantage Series White Paper Smart Buffering", 10 pages, 2016.

Hoeiland-Joergensen et al., "The FlowQueue-CoDel Packet Scheduler and Active Queue Management Algorithm", Internet Engineering Task Force (IETF) as draft-ietf-aqm-fq-codel-06 , 23 pages, Mar. 18, 2016.

U.S. Appl. No. 14/718,114 Office Action dated Sep. 16, 2016.

U.S. Appl. No. 14/672,357 Office Action dated Sep. 28, 2016.

CISCO Systems, Inc., "Priority Flow Control: Build Reliable Layer 2 Infrastructure", 8 pages, 2015.

Gran et al., "Congestion Management in Lossless Interconnection Networks", Submitted to the Faculty of Mathematics and Natural Sciences at the University of Oslo in partial fulfillment of the requirements for the degree Philosophiae Doctor, 156 pages, Sep. 2013.

Pfister et al., "Hot Spot Contention and Combining in Multistage Interconnect Networks", IEEE Transactions on Computers, vol. C-34, pp. 943-948, Oct. 1985.

Zhu et al.,"Congestion control for large-scale RDMA deployments", SIGCOMM'15, pp. 523-536, Aug. 17-21, 2015.

U.S. Appl. No. 15/075,158 office action dated Aug. 24, 2017.

U.S. Appl. No. 14/967,403 office action dated Nov. 9, 2017.

U.S. Appl. No. 15/081,969 office action dated Oct. 5, 2017.

European Application # 17172494.1 search report dated Oct. 13, 2017.

European Application # 17178355 search report dated Nov. 13, 2017.

U.S. Appl. No. 15/063,527 office action dated Feb. 8, 2018.

U.S. Appl. No. 15/161,316 office action dated Feb. 7, 2018.

U.S. Appl. No. 15/081,969 office action dated May 17, 2018.

U.S. Appl. No. 15/432,962 office action dated Apr. 26, 2018.

U.S. Appl. No. 15/161,316 Office Action dated Jul. 20, 2018.

* cited by examiner

FLEXIBLE ALLOCATION OF PACKET BUFFERS

FIELD OF THE INVENTION

The present invention relates generally to packet communication networks, and particularly to methods and systems for packet switching and flow control in such networks.

BACKGROUND

Switches used in high-speed packet networks, such as Ethernet and InfiniBand networks, typically contain buffer memories. Packets received by the switch through one of its interfaces are stored temporarily in a buffer memory while awaiting transfer to the appropriate egress interface or possibly, in the case of multicast packets, to multiple egress interfaces. Although buffer memory may be allocated statically to each interface, many modern packet switches use a shared memory, in which buffer space is allocated dynamically to different interfaces and queues depending on traffic load and memory availability.

In packet-switched networks, such as Ethernet, switches have buffers that facilitate lossless operation. When the rate of incoming packets from a source is higher than the switch can accommodate, however, data can accumulate in the buffer, and packets may be dropped due to buffer overflow. To ameliorate this problem, Ethernet switches send link-level flow-control messages when the buffer fill level of a particular queue or ingress port and priority exceeds a specified threshold, called the XOFF threshold. The flow-control message is sent to the source of the packets to instruct the source to stop transmitting packets.

For this purpose, Annex 31B of the IEEE 802.3 specification defines an optional flow control operation using "PAUSE" frames. When the receiver on a given link transmits a PAUSE frame to the transmitter, it causes the transmitter to temporarily stop all transmission on the link (except certain control frames) for a period of time that is specified in the PAUSE frame. This pause command mechanism enables the receiver to recover from states of buffer overfill.

Recently, a number of new IEEE standards for data center bridging (DCB) have been proposed, offering enhanced Ethernet flow control capabilities. For example, the IEEE 802.1Qbb project authorization request (PAR) provides priority-based flow control (PFC) as an enhancement to the pause mechanism described above. PFC creates eight separate virtual links on a given physical link and allows the receiver to issue commands that pause and restart the virtual links independently. PFC thus enables the operator to implement differentiated quality of service (QoS) policies for the eight virtual links.

Due to delays in receiving and acting on flow-control messages at the transmitter, the receiving switch will continue receiving frames from the transmitter for a certain amount of time even after sending the XOFF (PAUSE) message. In view of this delay, the switch typically reserves an additional buffer to admit the packets that may arrive after the flow-control message is sent. This reserved buffer is referred to as the lossless headroom, or, simply, headroom.

It is possible for multiple ports to share headroom space in a switch buffer. For example, U.S. Patent Application Publication 2013/0250757 describes mechanisms to reduce headroom size while minimizing dropped packets by using a shared headroom space between all ports, and providing a randomized delay in transmitting a flow-control message.

As another example, U.S. Patent Application Publication 2013/0250762 describes a method for achieving lossless behavior for multiple ports sharing a buffer pool. Packets are "colored" and stored in a shared packet buffer without assigning fixed page allocations per port. The packet buffer is divided into three areas: an unrestricted area, an enforced area, and a headroom area. Regardless of the fullness level, when a packet is received it will be stored in the packet buffer. If the fullness level is in the unrestricted area, no flow-control messages are generated. If the fullness level is in the enforced region, a probabilistic flow-control generation process is used to determine whether a flow-control messages will be generated. If the fullness level is in the headroom area, flow-control is automatically generated.

SUMMARY

Embodiments of the present invention that are described hereinbelow provide improved techniques for handling buffer memory in a switch and apparatus implementing such techniques.

There is therefore provided, in accordance with an embodiment of the invention, communication apparatus, including multiple ports configured to serve as ingress ports and egress ports for connection to a packet data network. A single memory array is coupled to the ports and configured to contain both a respective headroom allocation for each ingress port and a shared buffer holding data packets for transmission in multiple queues via the egress ports. Control logic is configured to adjustably allocate to each ingress port a respective volume of memory within the single memory array to serve as the respective headroom allocation, and to queue the data packets in the multiple queues in the single memory array for transmission through the egress ports.

Typically, the single memory array is configured so that the control logic can allocate any portion of the memory array to the headroom allocation of the ingress ports.

In the disclosed embodiments, the control logic is configured to monitor a fill level of the respective volume of the memory that is allocated to serve as the respective headroom allocation for each ingress port, and to apply flow-control operations responsively to the fill level. Typically, the control logic is configured to monitor the fill level for each ingress port by incrementing a headroom count when a data packet is written from the ingress port to a location in the memory array, and decrementing the headroom count when the data packet is transferred to the egress ports or to the shared buffer. Additionally or alternatively, the control logic is configured to transfer the data packet to the shared buffer without copying the data packet from the location in the memory array to a new location, while incrementing a shared buffer count.

In some embodiments, the data packets received from the network are written from the ingress ports to respective locations in the single memory array, and the control logic is configured to transfer the data packets directly from the respective locations to the egress ports. Typically, the received data packets are not copied from the respective locations to different locations in the shared buffer before transfer to the egress ports. Additionally or alternatively, the control logic is configured, upon writing of the data packets from the ingress ports to the respective locations in the single memory array, to place entries corresponding to the received data packets in the queues for transmission through the egress ports, and to transfer the data packets from the respective headroom allocation to the shared buffer before the transmission without modifying the entries in the queues.

There is also provided, in accordance with an embodiment of the invention, a method for communication, which includes receiving data packets from a packet data network through an ingress port of a network element having multiple ports configured to serve as ingress ports and egress ports. The data packets are transferred from the ingress port to a single memory array, which is configured to contain both a respective headroom allocation for each ingress port and a shared buffer holding the data packets for transmission in multiple queues via the egress ports. A respective volume of memory within the single memory array is adjustably allocated to each ingress port to serve as the respective headroom allocation. The data packets are queued in the multiple queues in the single memory array for transmission through the egress ports.

The present invention will be more fully understood from the following detailed description of the embodiments thereof, taken together with the drawings in which:

DETAILED DESCRIPTION OF EMBODIMENTS

In some switches, multiple ports share a headroom memory. For example, U.S. patent application Ser. No. 14/718,114, filed May 21, 2015, whose disclosure is incorporated herein by reference, describes a switch, which comprises a memory containing both a respective fixed headroom allocation for each port of the switch and a shared headroom buffer, which is available to be shared among all (or at least some of) the ports. Flow-control logic in the switch assigns a respective variable headroom allocation to each of the ports within the shared headroom buffer.

Separate and apart from the headroom buffers, as noted above, some switches comprise a shared memory, which holds packets that are queued for transmission through different egress ports. After admission through the ingress ports to the headroom buffers, packets are internally transferred within the switch to the shared memory, where they await transmission to the network. In some cases, when the egress ports are free, it may be possible to transfer packets directly from the headroom buffers to the egress ports. In many or most cases, however, internal transfer to the shared memory will be required before transmission. These internal transfers require additional switching and packet handling logic within the switch. Furthermore, the separation between headroom and shared buffer memories limits that capability of the switch to respond to different network traffic patterns and system requirements.

Embodiments of the present invention that are described herein provide communication apparatus, such as a switch, that is able to address and overcome these limitations. The apparatus comprises multiple ports, which are configured to serve as ingress ports and egress ports connected to a packet data network. A single memory array in the apparatus is coupled to the ports. This single memory array is configured to contain both a respective headroom allocation for each ingress port and a shared buffer, which holds data packets for transmission in multiple queues via the egress ports. Control logic in the apparatus adjustably allocates to each ingress port a respective volume of memory within this single memory array to serve as the respective headroom allocation, and also queues the data packets in the memory array for transmission through the egress ports.

The term "single memory array," as used in the present description and in the claims, refers to a logical memory array, meaning that the entire memory array in question belongs to the same memory address range. In the present embodiments, this same, single memory can be allocated to server as both headroom and shared buffer space, using the same unified address range. In terms of physical memory, it can be advantageous to use a single physical memory array for this purpose, but the present embodiments are not limited to this sort of physical implementation, and the (logical) memory array referred to in the description and the claims may extend over multiple physical memory arrays, which share the unified address range.

In the disclosed embodiments, the single memory array is configured so that the control logic can allocate any portion of the memory array to the headroom allocations of the ingress ports. In other words, any desired fraction of the memory array may be allocated to each ingress port, as static and/or dynamic allocations. Different headroom volumes may be allocated to different ingress ports. The headroom allocations may overlap with one another and may cumulatively occupy even the entire available memory space in the array (at the expense, of course, of available shared buffer space). The system operator is thus able to set memory allocation policies, to be implemented by the control logic, freely according to the network configuration and pattern of operation.

Typically, the control logic monitors the fill level of the respective volume of the memory that is allocated to serve as the headroom allocation for each ingress port, and applies flow-control operations in response to the fill level (for example, when the fill level reaches a certain threshold). For this purpose, in the disclosed embodiments, the control logic maintains a headroom count for each ingress port, incrementing the count whenever a data packet is written from the ingress port to a location in the memory array, and decrementing the count when the data packet is transferred to an egress port or to the shared buffer portion of the memory array.

In some embodiments, the control logic transfers the data packet from the headroom to the shared buffer without physically copying the data packet from its original location in the memory array to a new location. Rather, in this case, the control logic simply increments a shared buffer count, while decrementing the headroom count, to indicate that the packet has been transferred from the headroom allocation to the shared buffer allocation. This approach has the advantage that packets are written to the memory only once, and need not be copied from one memory location to another before transmission. The control logic thus transfers substantially all data packets directly to the egress ports from the locations to which they were initially written by the ingress ports.

This approach is also advantageous in simplifying queue handling within the apparatus: As soon as a data packet has been written to its location in the memory array, the control logic places a corresponding entry in the appropriate queue for transmission through the designated egress port. Since the packet location does not change upon transfer from the headroom allocation to the shared buffer, there is no need for the control logic to modify the entries in the queues when such a transfer occurs.

Alternatively, in other embodiments, the headroom and shared buffer functions receive separate partitions of the single memory array, i.e., different address ranges in the memory array are allocated to the headroom and to the shared buffer. In such embodiments, packets in some cases will be copied from the headroom to the shared buffer partition before transmission. Even so, these embodiments maintain the advantage of flexible allocation of headroom size, as explained above, as well as simplified switching logic in comparison with switches using separate memory arrays for headroom and shared buffer spaces.

Figure 1:
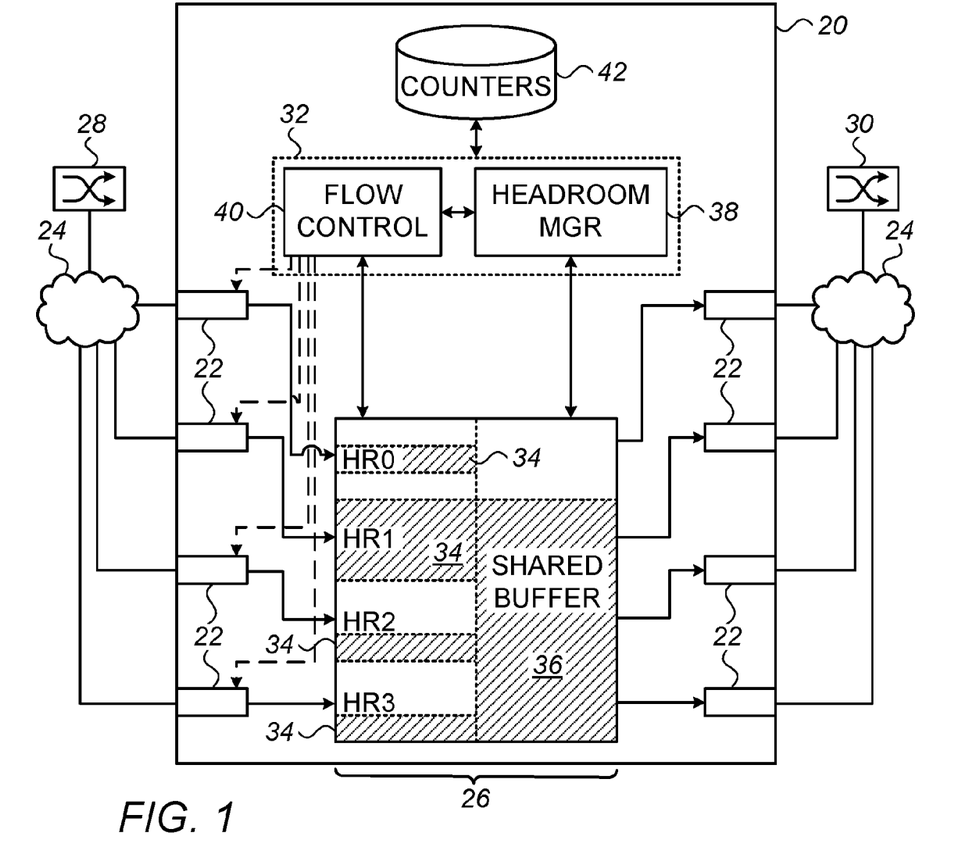
FIG. 1 is a block diagram that schematically illustrates a switch with a single memory array, in accordance with an embodiment of the invention.

FIG. 1 is a block diagram that schematically illustrates a network switch 20 with a single memory array 26, in accordance with an embodiment of the invention. Switch 20 comprises multiple ports 22, which are connected via links of a packet data network 24 to communicate with peer devices 28, 30. Memory array 26 in switch 20 receives packets from and passes packets to ports 22, under the direction of control logic 32. (As noted earlier, memory array 26 is configured as a single logical array, extending over one or more physical memory arrays.) For the sake of visual clarity, ports 22 at the left side of switch 20 are shown in FIG. 1 as ingress ports, while ports 22 at the right side of the switch are shown as egress ports. In practice, however, all of the switch ports are typically configured to operate as both ingress and egress ports.

Within memory array 26, control logic 32 allocates a respective volume of memory to serve as a headroom allocation 34 (marked HR0, HR1, HR2, . . . ) for each ingress port 22, in order to hold packets received from network 24 through the port. Another portion of array 26 is allocated as a shared buffer 36, holding data packets for transmission in multiple queues via egress ports 22. Control logic 32 is able to adjust the volumes of the different headroom allocations 34, as well as the overall cumulative volume of headroom allocations 34 relative to shared buffer 36. These adjustments may be in the form of static pre-allocations, as well as dynamic allocations made in response to traffic on network 24 and relative fill levels of the different allocations (indicated schematically by the shading within array 26 in FIG. 1). As noted above, memory array 26 is typically configured so that control logic 32 can allocate any portion of the memory array to headroom allocations 34.

For convenience in visualizing the division of functions within array 26, allocations 34 and shared buffer 36 are marked in FIG. 1 as separate physical regions. In practice, however, these boundaries are logical, rather than physical, and can shift dynamically under the control of a headroom manager 38 within control logic 32. For example, as explained further hereinbelow, headroom manager 38 typically transfers packets from headroom allocations 34 to shared buffer 36 without actually copying the packets from one memory location to another. Rather, the headroom manager simply increments and decrements corresponding counters, which are held in a count memory 42 within switch 20, in order to keep track of the actual occupancy levels of the various memory allocations. Thus, the physical address of a given packet in memory array 26 may initially be a part of one of headroom allocations 34 and may then shift to be a part of shared buffer 36 and back again to headroom after the packet is transmitted out through an egress port.

A flow controller 40 within control logic 32 handles flow-control operations, such as transmitting PAUSE frames and dropping packets as necessary when the fill levels of headroom allocations 34 reach applicable thresholds. For this purpose, headroom manager 38 monitors the fill levels of headroom allocation 34 for each ingress port 22 and signals flow controller 40 accordingly. As noted earlier, the headroom count in count memory 42 is incremented when a data packet is written from an ingress port 22 to a location in memory array 26, and headroom manager 38 decrements the headroom count when the data packet is transferred to an egress port 22 or to shared buffer 36. When a data packet is transferred to shared buffer 36 (typically performed without copying the data packet to a new location in memory array 26), headroom manager 38 increments a shared buffer count in count memory 42.

Although flow controller 40 and control logic 32 as a whole are shown in FIG. 1, for the sake of simplicity, as a single, centralized functional block, the functions of this logic are typically distributed among a central controller and individual port logic units that are associated with ports 22. The functions of control logic 32 may be implemented in hard-wired or programmable logic circuits or in one or more programmable processing units, driven by software or firmware, or in a combination of such elements.

Figure 2:
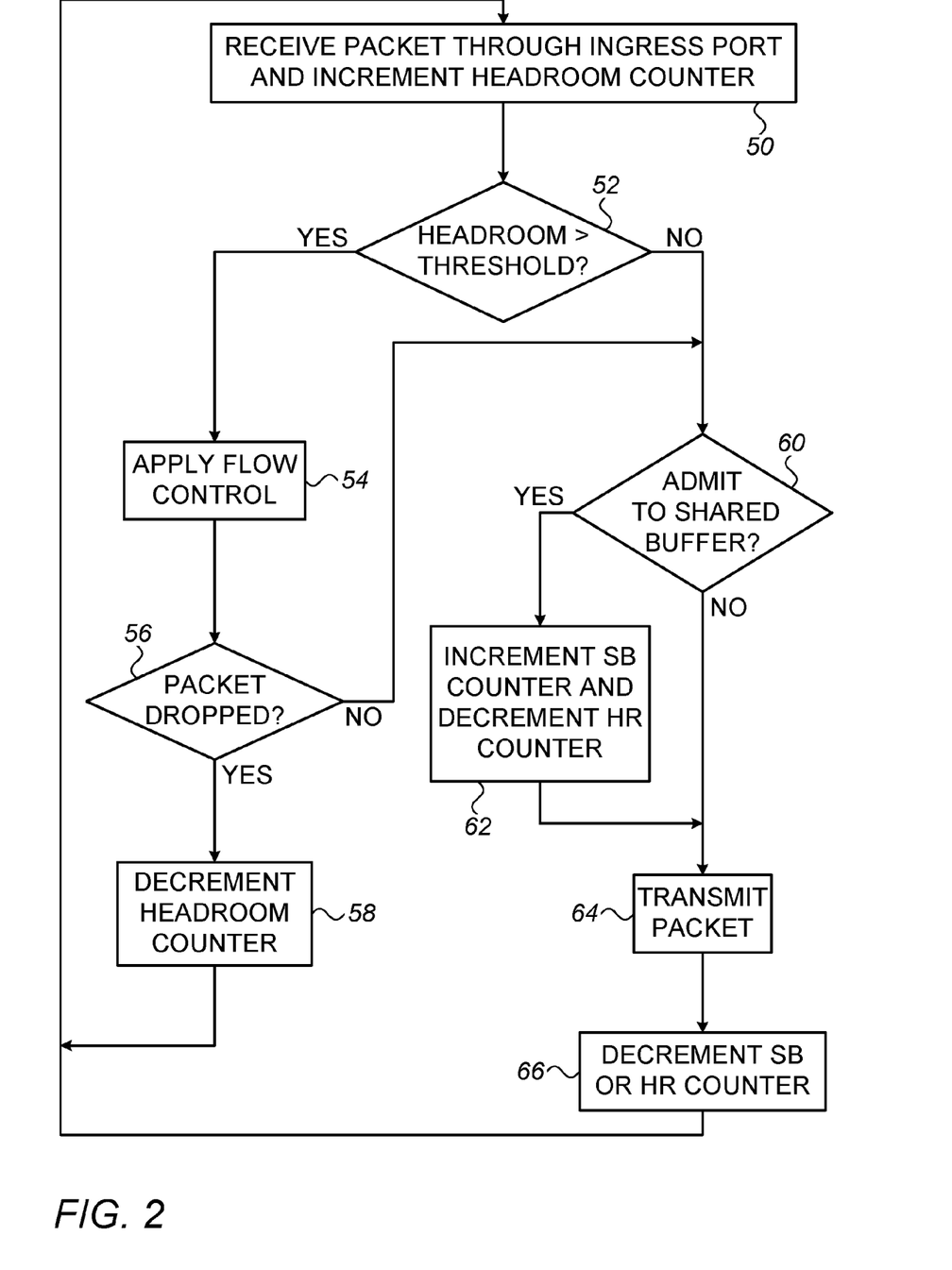
FIG. 2 is a flow chart that schematically illustrates a method for handling packets in a switch with a shared memory, in accordance with an embodiment of the invention.

FIG. 2 is a flow chart that schematically illustrates a method for handling packets in a switch with a shared memory, in accordance with an embodiment of the invention. The method is described hereinbelow, for the sake of clarity and convenience, with reference to the elements of switch 20. The principles of this method may alternatively be implemented, however, in switches and other sorts of network apparatus in which a memory array is shared between headroom and buffering functions.

The method of FIG. 2 is initiated when a packet is received from network 24 through an ingress port 22, at a packet reception step 50. For efficient packet handling, ingress port 22 writes the packet directly to a location in memory array 26 belonging to headroom allocation 34 and increments the headroom counter in count memory 42. Because array 26 is configured as a single logical memory array, ingress port can write the packet to any free address in the array. This approach may lead, in some circumstances, to over-filling of the headroom allocation, but it avoids delays that may be incurred in communication between the ingress port and headroom manager 38.

Headroom manager 38 checks the headroom counter in memory 42 against the applicable flow control threshold, at a headroom checking step 52. The threshold is typically set as a certain fraction of the total headroom allocation 34 for the ingress port in question. When the headroom count exceeds the threshold, headroom manager 38 signals flow controller 40 to take appropriate action, at a flow control step 54. This action may comprise, for example, transmitting a PAUSE frame from ingress port 22 to peer node 28 from which the packet originated and/or dropping the packet.

Headroom manager 38 decides what actions to apply to the data packet and the headroom counter, depending on whether or not the packet was dropped from memory array 26, at a dropping decision step 56. If flow controller 40 dropped the packet, headroom manager 38 decrements the corresponding headroom counter, at a headroom decrementation step 58, and awaits arrival of the next packet.

On the other hand, when the headroom counter was found to be below the threshold at step 52, or when the packet was not dropped despite the counter being over threshold, control logic 32 queues the packet for transmission through a designated egress port 22. Typically, for this purpose, control logic 32 places an entry corresponding to the received data packet in the appropriate queue for transmission through the egress port. Each egress port can have multiple queues, for different priority groups, and thus a single port can serve as multiple logical egress interfaces. For the sake of simplicity, the description that follows and the figures relate simply to egress ports without reference to priorities. By the same token, each ingress port can have multiple headroom allocations assigned to different priority groups, with flow control implemented per priority group, but the present description refers simply to ingress ports without reference to priority. The principles of this description, however, may equally be applied, mutatis mutandis, to logical ingress and egress interfaces that are differentiated by both port number and priority group.

Once the packet has been queued, headroom manager 38 decides whether to admit the packet to shared buffer 36, at a buffer decision step 60. The purpose of this admission is to free space in headroom allocation 34 when it is not possible or desirable to transfer the packet directly to egress port 22. Control logic 32 is able to transfer data packets directly from the respective locations in headroom allocations 34 to egress ports 22, without passing through shared buffer 36 either physically or logically. Such direct transfer is sometimes not possible, however, particularly when there are preceding packets waiting in the same queue for transmission through the egress port.

Upon deciding to transfer a given packet from headroom allocation 34 to shared buffer 36, headroom manager 38 increments the shared buffer (SB) counter in count memory 42 and decrements the corresponding headroom (HR) counter, at a counter adjustment step 62. (The SB counter may be maintained per egress port and priority group or, alternatively, per ingress port and priority group, depending on the selected buffer admission and management scheme.) In general, as explained above, the transfer to shared buffer 36 is only a logical transfer, and the packet itself is not copied from its original location in memory array 26 to a different location before transfer to egress port 22. As a result, there is also no need for control logic 32 to modify the queue entry corresponding to the packet. Rather, the original entry simply awaits execution in the queue in which it was originally placed.

When the entry reaches the front of the queue (whether or not the packet was transferred to shared buffer 36), control logic 32 transfers the packet to the designated egress port for transmission to network 24, at a packet transmission step 64. Headroom manager 38 then decrements the SB or HR counter, as appropriate, at a counter decrementation step 66.

Figure 3A:
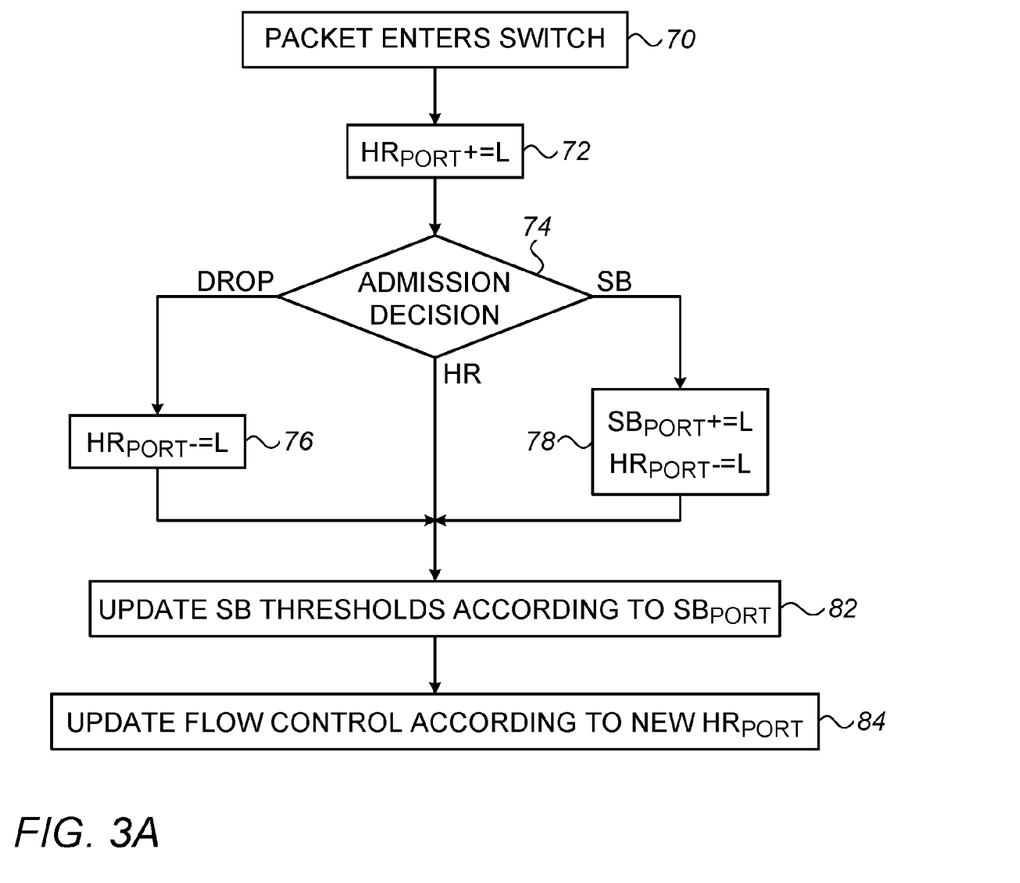
FIGS. 3A and 3B are flow charts that schematically illustrates a method for tracking memory occupancy, in accordance with an embodiment of the invention.
Figure 3B:
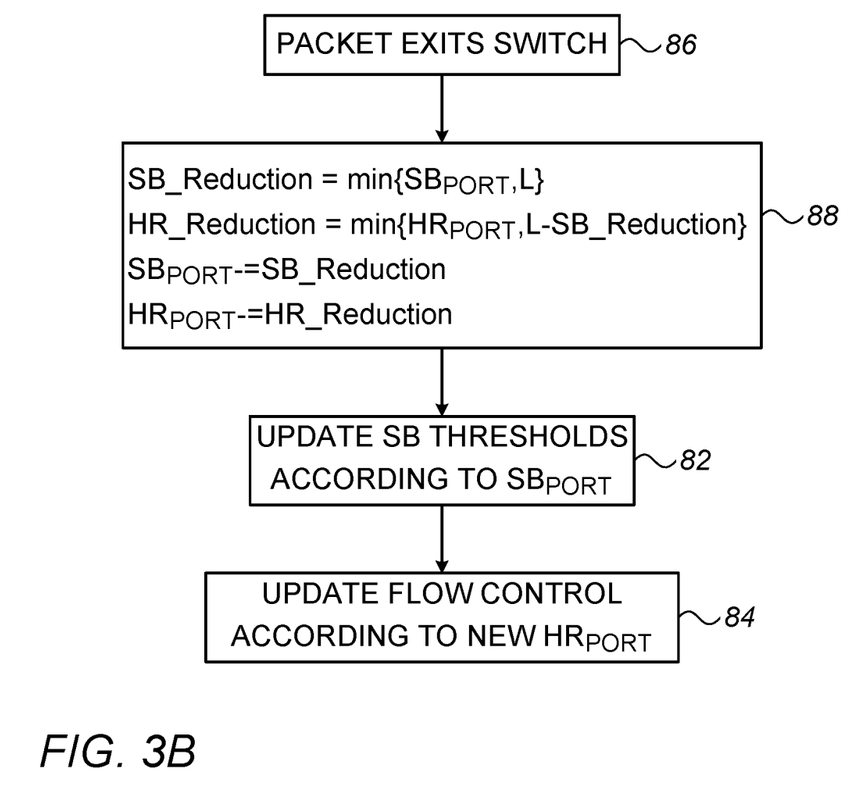

FIGS. 3A and 3B are flow charts that schematically illustrates a method for tracking occupancy of the allocations in memory array 26, in accordance with an embodiment of the invention. This method is carried out by headroom manager 38 as a part of and in conjunction with the method of FIG. 2. FIG. 3A shows the process followed in handling incoming packets, while FIG. 3B shows the process for handling transmission of outgoing packets.

The method shown in FIG. 3A is initiated when a packet enters switch through one of ports 22, at an ingress initiation step 70. As explained above, port 22 writes the packet to a free location in memory 26 and increments the headroom count (HR) accordingly, at a packet intake step 72. The amount of the increment will be the length of the packet in question, L, which is typically measured in bytes.

With respect to each incoming packet, headroom manager 38 makes an admission decision, at an admission step 74. When the headroom is overfilled, the headroom manager drops the packet (or instructs flow controller 40 to drop the packet) and releases the memory space to which the packet was written. In this case, headroom manager 38 decrements the headroom counter by the packet length, at a headroom release step 76.

Otherwise, headroom manager 38 decides at step 74 whether to increment the headroom (HR) count or the shared buffer (SB) count. In the present embodiment, both of these counts are maintained separately in count memory 42 for each ingress port, and are thus referred to as $HR_{PORT}$ and $SB_{PORT}$. The decision as to which count to increment depends upon whether or not the packet was admitted to shared buffer 36. If so, headroom manager 38 decrements $HR_{PORT}$ by L and increments $SB_{PORT}$ by L, at a shared buffer incrementation step 78. Otherwise, the packet remains in the shared headroom, and no count adjustments are needed.

Based on the results of the preceding steps, as appropriate, headroom manager 38 updates the thresholds of shared buffer 36 according to the current value of $SB_{PORT}$, at a shared buffer update step 82. The headroom manager also updates the flow control thresholds for the ingress port 22 in question according to the current value of $HR_{PORT}$, at a headroom update step 84.

The method shown in FIG. 3B is initiated when a packet exits switch through one of ports 22, at an egress initiation step 86. In this case, headroom manager 38 decrements either the HR count or the SB count, at a count decrementation step 88, while giving preference to decrementing the SB count. For this purpose, the headroom manager computes an SB reduction amount as the minimum of the current $SB_{PORT}$ count and the packet length L. It then computes an HR reduction amount as the minimum of the current $HR_{PORT}$ count and the difference between L and the SB reduction. As a result, the HR reduction amount will be zero unless the current $SB_{PORT}$ count is less than L. Headroom manager 38 then reduces each of $SB_{PORT}$ and $HR_{PORT}$ by the corresponding reduction amount to give the new, reduced count values.

Following step 88, headroom manager 38 updates the thresholds of shared buffer 36 according to the current value of $SB_{PORT}$, at step 82, and updates the flow control thresholds, at step 84, as described above.

Figure 4:
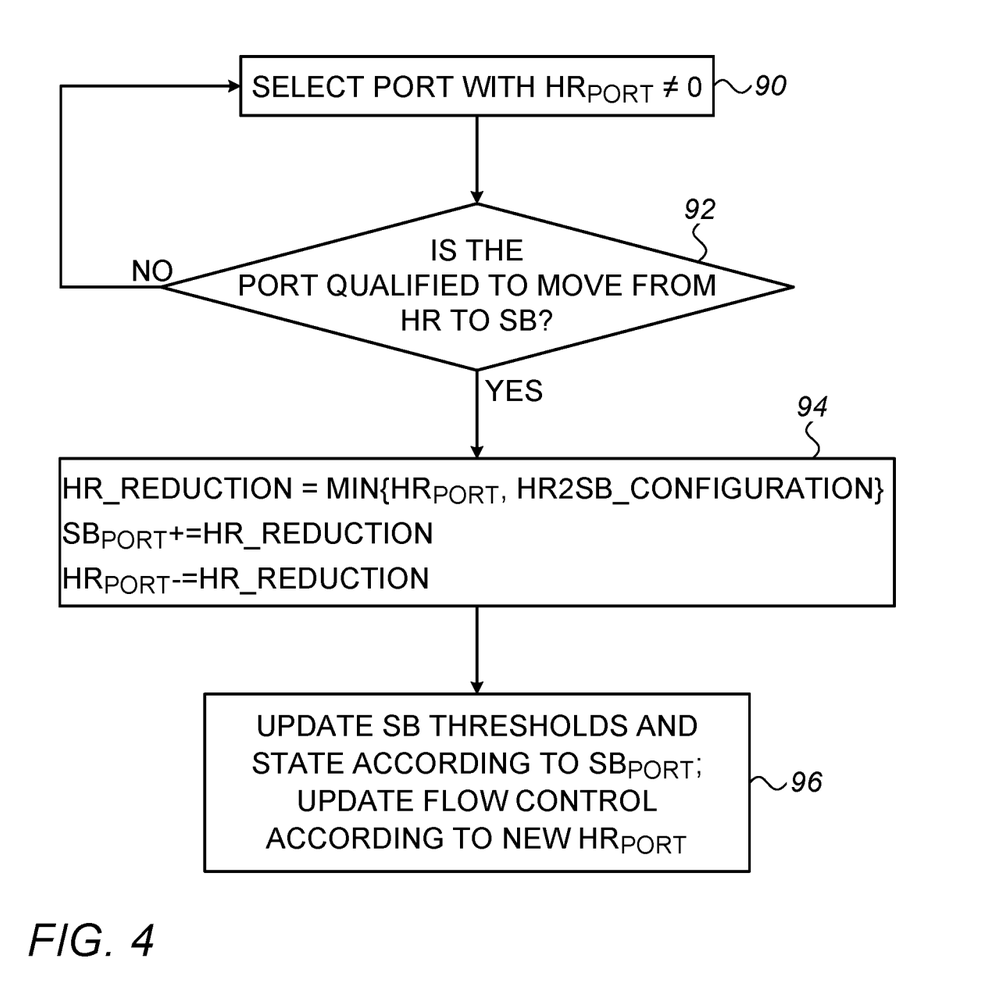
FIG. 4 is a flow chart that schematically illustrates a method for releasing buffer space, in accordance with an embodiment of the invention.

FIG. 4 is a flow chart that schematically illustrates a method for releasing buffer space in memory array 26, in accordance with an embodiment of the invention. This method is carried out by headroom manager 38 as a background process, in parallel with the functionality described above. It frees space in headroom allocations 34 by logically transferring data to shared buffer 36, though without actually copying the data from one location to another. The volume of data transferred is not necessarily tied to any particular packet or packet size, but is instead governed by a configurable data transfer parameter, referred to as HR2SB_Configuration.

Headroom manager 38 selects a port 22 whose headroom allocation 34 is to be freed up, at a port selection step 90. Any port can be selected, with the only limitation being that the headroom counter $HR_{PORT}$ is not zero. The headroom manager then checks whether this port is qualified for transfer of data from headroom allocation 34 to shared buffer 36, at a transfer checking step 92. For example, headroom manager 38 may verify at step 92 that the current shared buffer count for this port, $SB_{PORT}$, is less than a certain maximum value, in order to ensure that the selected port does not take over more than its fair share of shared buffer 36. This maximum value may be set statically, or it may vary depending upon the overall occupancy of the shared buffer.

Having chosen a qualified port, headroom manager 38 determines the amount of data to transfer from headroom allocation 34 of the port to shared buffer 36, at a transfer computation step 94. For this purpose, the headroom manager computes a headroom reduction factor, HR_Reduction, as the minimum of the current headroom count $HR_{PORT}$ and the data transfer parameter HR2SB_Configuration. It then increments the shared buffer count $SB_{PORT}$ by the headroom reduction factor and decrements the headroom count $HR_{PORT}$ by this same amount.

Following this logical transfer of data, headroom manager 38 applies the new values of $SB_{PORT}$ and $HR_{PORT}$ in updating the state and threshold of shared buffer 36 and updating the flow control thresholds for port 22, at an update step 96. This update is similar to that performed at steps 82 and 84 in FIG. 3, as described above.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:
multiple ports configured to serve as ingress ports and egress ports for connection to a packet data network;
a single memory array, coupled to the ports and configured to contain both a respective headroom allocation volume size for each ingress port and a shared buffer holding data packets for transmission in multiple queues via the egress ports; and
control logic, which is configured to:
manage for each ingress port the respective headroom allocation volume size and a respective headroom occupancy counter, and to manage a shared buffer occupancy counter,
for each packet received by any of the ingress ports, write the packet directly to the single memory array and to increment the respective headroom occupancy counter of the ingress port through which the packet was received,
for each received packet stored in the single memory array, decide whether to admit the packet to the shared buffer, and if decided to admit the packet to the shared buffer, to increment the shared buffer occupancy counter and decrement the respective headroom occupancy counter, without copying the packet from one memory location to another, and
monitor a fill level of the headroom of each ingress port based on the headroom allocation volume size and the headroom occupancy counter of the ingress port, and to apply flow-control operations for the ingress port responsively to the fill level.

2. The apparatus according to claim 1, wherein the single memory array is configured so that the control logic can allocate any portion of the memory array to the headroom allocation of the ingress ports.

3. The apparatus according to claim 1, wherein the control logic is configured to decrement the headroom occupancy counter of an ingress port, when a data packet is transferred from the headroom allocation of the port to an egress port.

4. The apparatus according to claim 1, wherein the data packets received from the network are written from the ingress ports to respective locations in the single memory array, and wherein the control logic is configured to transfer the data packets directly from the respective locations to the egress ports.

5. The apparatus according to claim 4, wherein the control logic is configured, upon writing of the data packets from the ingress ports to the respective locations in the single memory array, to place entries corresponding to the received data packets in the multiple queues for transmission through the egress ports, and to transfer the data packets from the respective headroom allocation to the shared buffer before the transmission without modifying the entries in the multiple queues.

6. A method for communication, comprising:
receiving data packets from a packet data network through an ingress port of a network element having multiple ports configured to serve as ingress ports and egress ports;
transferring the data packets from the ingress port to a single memory array, which is configured to contain both a respective headroom allocation volume size for each ingress port and a shared buffer holding the data packets for transmission in multiple queues via the egress ports;
managing for each ingress port the respective headroom allocation volume size and a respective headroom occupancy counter, and managing a shared buffer occupancy counter;
for each packet received by any of the ingress ports, writing the packet directly to the single memory array and incrementing the respective headroom occupancy counter of the ingress port through which the packet was received;
for each received packet stored in the single memory array, deciding whether to admit the packet to the shared buffer, and if decided to admit the packet to the shared buffer, incrementing the shared buffer occupancy counter and decrementing the respective headroom occupancy counter, without copying the packet from one memory location to another;
monitoring a fill level of the headroom of each ingress port based on the headroom allocation volume size and the headroom occupancy counter of the ingress port, and applying flow-control operations for the ingress port responsively to the fill level; and
queuing the data packets in the multiple queues in the single memory array for transmission through the egress ports.

7. The method according to claim 6, further comprising configuring the single memory array so that any portion of the memory array can be allocated to the headroom allocation of the ingress ports.

8. The method according to claim 6, comprising decrementing the headroom occupancy counter of one of the ingress ports when a data packet is transferred from the headroom allocation of the port to one of the egress ports.

9. The method according to claim 6, wherein receiving the data packets comprises writing the data packets from the ingress ports to respective locations in the single memory array, and wherein queuing the data packets comprises transferring the data packets directly from the respective locations to the egress ports.

10. The method according to claim 9, wherein queuing the data packets comprises, upon writing of the data packets from the ingress ports to the respective locations in the single memory array, placing entries corresponding to the received data packets in the multiple queues for transmission through the egress ports, and transferring the data packets from the respective headroom allocation to the shared buffer before the transmission without modifying the entries in the multiple queues.

11. The apparatus according to claim 1, wherein the control logic is configured to manage for each ingress port a separate shared buffer count of data transferred from headroom allocation for the each ingress port to the shared buffer and to limit an amount of data transferred from headroom allocation for the each ingress port to the shared buffer, to a respective ingress port threshold.

* * * * *